United States Patent
Patluri et al.

(10) Patent No.: US 11,869,240 B1
(45) Date of Patent: Jan. 9, 2024

(54) SEMANTIC VIDEO SEGMENTATION

(71) Applicant: Amazon Technologies, Inc., Seattle, WA (US)

(72) Inventors: Abhinav Patluri, Seattle, WA (US); Nikhil Dinkar Attarde, Issaquah, WA (US); Vikash Kumar Jain, Hyderabad (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/119,373

(22) Filed: Dec. 11, 2020

(51) Int. Cl.
*H04N 21/233* (2011.01)
*H04N 21/466* (2011.01)
*H04N 19/132* (2014.01)
*G06V 20/40* (2022.01)
*G06T 7/11* (2017.01)
*H04N 21/845* (2011.01)

(52) U.S. Cl.
CPC ............... *G06V 20/41* (2022.01); *G06T 7/11* (2017.01); *G06V 20/49* (2022.01); *H04N 21/8456* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 2019/0289359 A1* | 9/2019 | Sekar | H04N 21/4333 |
| 2020/0275133 A1* | 8/2020 | Ni | G11B 27/031 |
| 2020/0365188 A1* | 11/2020 | Brinkman, Jr. | H04N 21/8549 |
| 2021/0319232 A1* | 10/2021 | Perazzi | G06F 17/15 |

* cited by examiner

*Primary Examiner* — Samuel D Fereja
(74) *Attorney, Agent, or Firm* — K&L Gates LLP

(57) ABSTRACT

Systems and techniques are generally described for semantically segmenting videos. In various examples, a selection of a first video may be received. A first query to segment the first video into segments related to a first category of content may be received. A first plurality of segments related to the first category may be determined. In some examples, time code data representing the first plurality of segments may be sent to a remote computing device, wherein a video player of the remote computing device is effective to play the first plurality of segments based at least in part on the time code data.

20 Claims, 8 Drawing Sheets

SEMANTIC VIDEO SEGMENTATION

BACKGROUND

In recent years, video-on-demand streaming services that stream video content to end-users over communication networks have become commonplace. In some cases, users are able to pause, fast forward, rewind, and even select particular pre-identified chapters of videos for playback. In many examples, video content is delivered in real-time via a content delivery network in an encoded format and is decoded by the client device for display. In various examples, video editing software provides an ability for users to manually edit video content in order to generate video segments and/or compilations of videos.

DETAILED DESCRIPTION

Figure 1A:
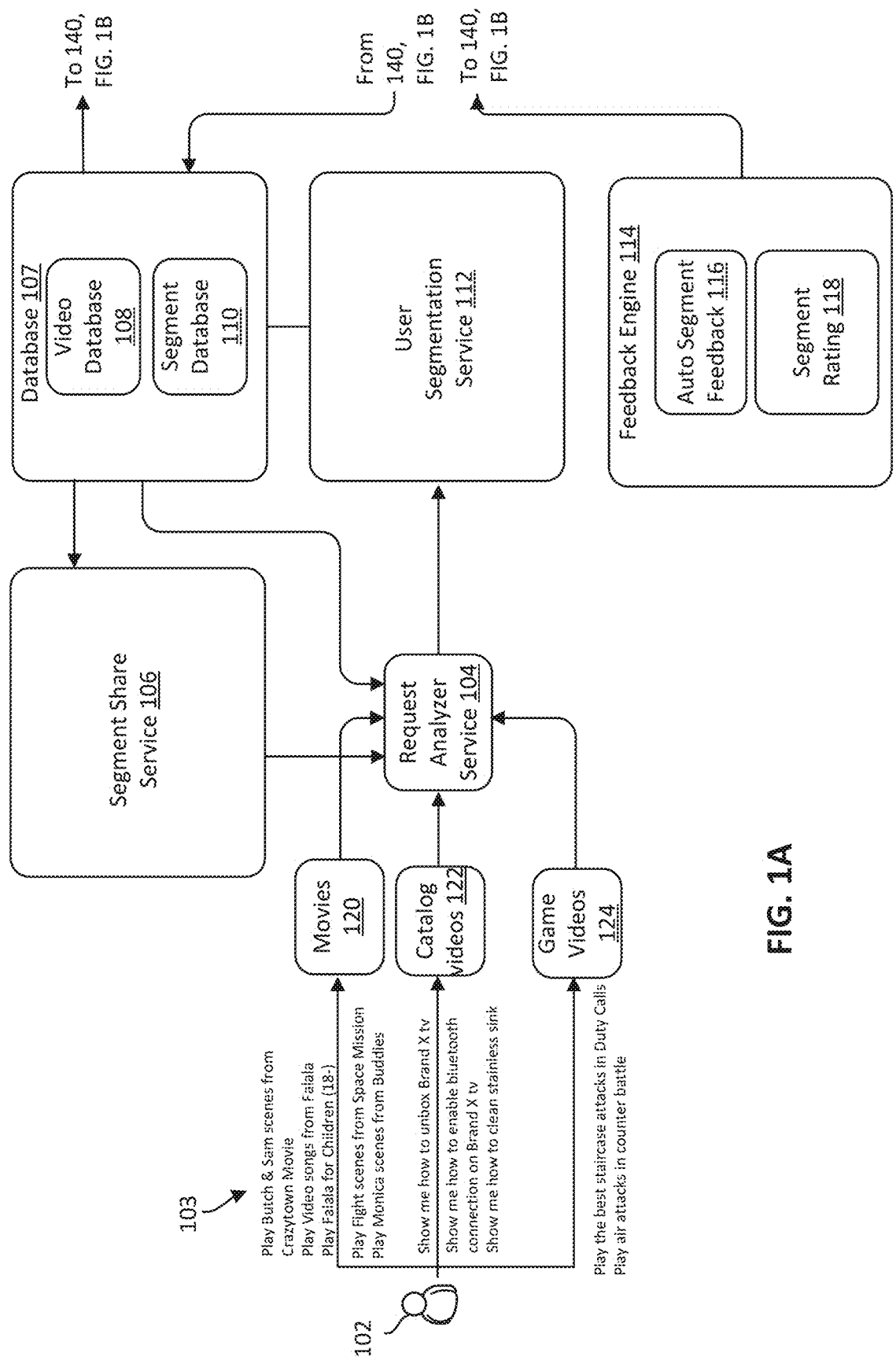
FIGS. 1A, 1B are block diagrams depicting an example system effective to perform semantic video segmentation, according to various embodiments of the present disclosure.

In the following description, reference is made to the accompanying drawings that illustrate several examples of the technology described herein. It is understood that other examples may be utilized and various operational changes may be made without departing from the scope of the present disclosure. The following detailed description is not to be taken in a limiting sense, and the scope of the embodiments described herein is defined only by the claims of the issued patent.

In present digital video streaming platforms, users have very little ability to play a desired sections of videos and/or portions of a video having a particular characteristic and/or pertaining to a particular category. Though manual bookmarking software provides users with the ability to bookmark, save, and edit videos at selected points, such software does not enable segmenting/tagging/grouping video content based on user queries for either selective playback and/or selective blocking. Often, if a user wants to see particular scenes and/or segments that are of interest to the particular user, the user is either required to fast forward and/or rewind through the video (e.g., using editing software and/or an interface of a video streaming service) and manually set multiple bookmarks. These bookmarks may overlap with other areas of interests for the user. For example, a user may bookmark all car chase scenes in a movie. Later, the user may want to bookmark all scenes involving a certain character for the same movie. Some of the car chase scenes may involve the character, while others may not. Accordingly, the user may need to manually bookmark the video to generate two different edits—one specific to the character, and another specific to car chase scenes. Such manual bookmarking is time consuming and may be frustrating from a user experience perspective In various examples described herein, an auto-segmentation machine learning service is employed to semantically segment input videos into segments related to a particular category. The auto-segmentation machine learning service analyzes various attributes of the video (e.g., music, motion, images, storylines/content, characters, etc.) to determine portions of the video that relate to a particular category. The portions—referred to herein as "segments"—may be stored in a segment database in association with the video and the particular category. The segments may be stored in the segment database as time code data comprising metadata associating various time spans of the video with the particular category.

For example, the auto-segmentation machine learning service may determine all portions of a movie (e.g., all scenes) featuring a particular character. In various examples, the auto-segmentation machine learning service may determine the portions by using image analysis and/or object recognition to determine whether or not the character is present in a given scene. Thereafter, the auto-segmentation machine learning service may store the time code data that includes time spans for all scenes including the character in a segment database in association with the movie. In this example, the character is the category and all segments have been determined to be related to the category (since all segments have been determined to include the character). For example, a (relatively minor) character (e.g., a character named "Butch") may appear in three scenes in a movie and may be represented by the time code data [20:21-23:40], [41:45-42:16], and [54:01-1:01:10]. The three segments represented by the time code data may be represented as the start time and the end time of each particular segment (e.g., [start time, end time]). The time code data may be stored in a segment database for the category Character=Butch for the particular movie.

Thereafter, a user may request (e.g., using a natural language interface such as a voice assistant and/or input text search interface) a video player to "Play all Butch scenes from Movie X." A request analyzer service may determine that the user wants to see scenes related to the category "Character" with the character being "Butch." Accordingly, the request analyzer service may search the segment database for the segments related to Butch in Movie X. The time code data may be sent to the video player on the user's device and the segments in which the character Butch appears may be streamed to and played back by the user's device in consecutive fashion, without playback of other, intervening segments.

Machine learning techniques may be used to predict the portions of a video that pertain to a particular input category. In various examples, the machine learning algorithms may learn features of the videos based on annotated input sample data, as described in further detail below. The features of a video may be used to classify different segments of a video as pertaining to one or more categories, based on the attributes of the different segments of the video (the attributes being represented by feature data). In various examples, some categories may be implicitly determined based on the different learned features of the video. In various other examples, some categories of the video may be learned based on the learned features and based on annotated training data that includes category labels. Categories may be revised and/or improved over time based on user feedback. For example, a plurality of users may request "dance scenes" from the movie "Step it Back." Initially, segments may be generated for the movie "Step it Back" based on a semantic understanding of what constitutes a "dance scene" (e.g., using learned features determined to pertain to a "dance scene," such as motion features, object recognition, audio features, etc.). However, users may provide user feedback on the various segments (e.g., a rating indicating user satisfaction/dissatisfaction for the segments provided in response to the query "show me dance scenes from the movie step it back"). The various machine learning algorithms described herein may refine the definition of the category "dance scene" based on the user feedback data to improve the relevance of the provided segments to the user query.

Machine learning techniques, such as those described herein, are often used to form predictions, solve problems, recognize objects in image data for classification, etc. For example, herein machine learning techniques may be used to determine segments of a video that pertain to various different categories. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Generally, in machine learning, an embedding is a mapping of a discrete, categorical variable to a vector of continuous numbers. In neural networks, embeddings may be of lower dimensions relative to the data that the embeddings represent. In various examples, features may be generated to represent attributes of a video. The features may be used to classify different segments of a video as belonging to one or more categories. For example, one or more features may represent violent content depicted in the video. As such, these features may be used by the machine learning algorithms described herein to classify the segment including the violent content to a segment categorized as "For Ages 18+" or to the category "Not suitable for children."

Figure 1B:
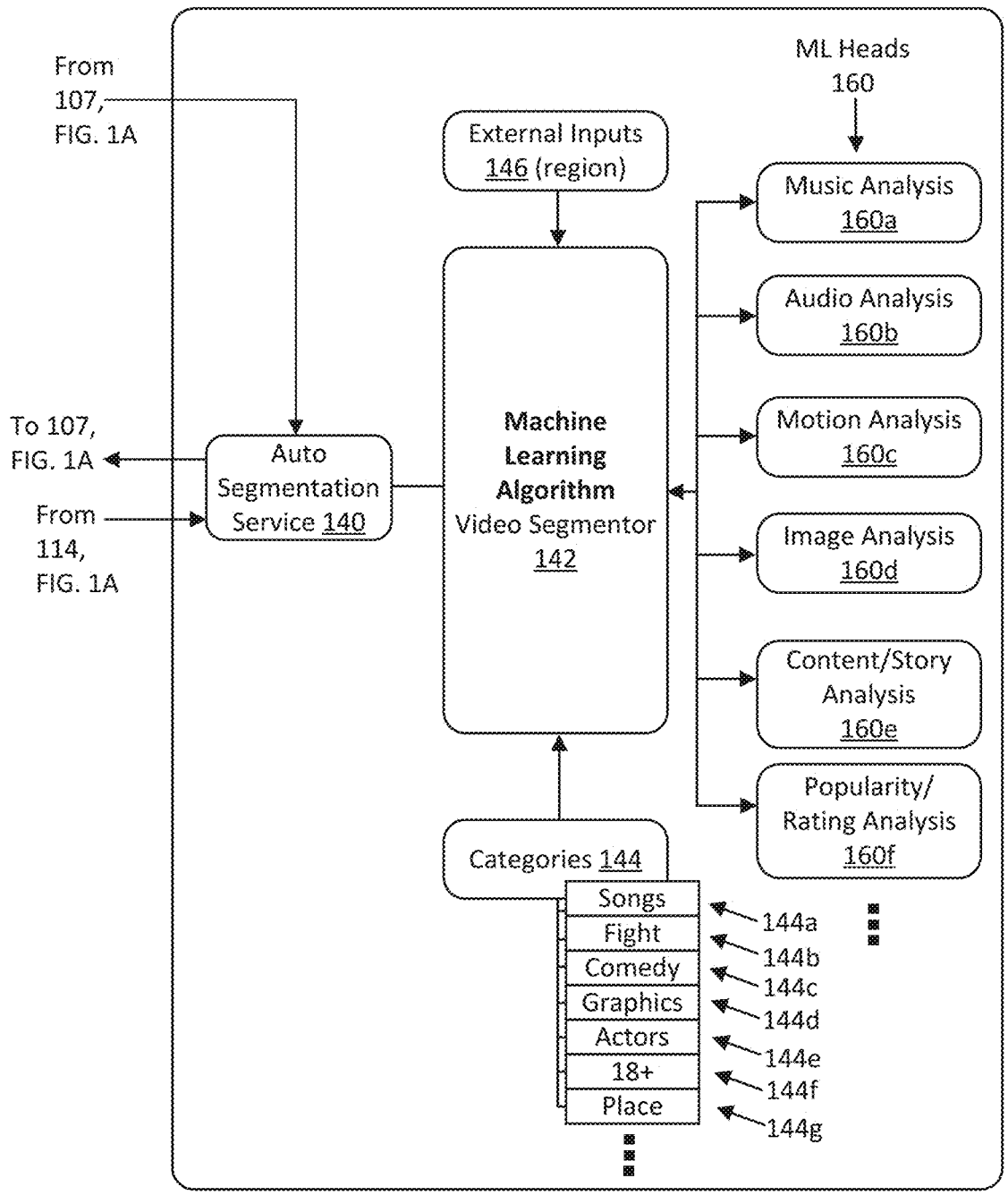

FIGS. 1A, 1B are block diagrams depicting an example system effective to perform semantic video segmentation, according to various embodiments of the present disclosure. Although not shown in FIGS. 1A, 1B, various components depicted in FIGS. 1A, 1B may be implemented by one or more computing devices. Such computing devices may communicate with one another and/or with one or more of the other components depicted in FIGS. 1A, 1B over a communication network (e.g., a local area network (LAN) and/or a wide area network (WAN) such as the internet). For example, the computing devices may communicate with non-transitory computer-readable memory that stores executable instructions effective to cause the computing devices to implement one or more of the various components and/or perform the various semantic video segmentation, video segment retrieval, and/or other techniques described herein.

FIG. 1A depicts a user 102 making a variety of requests for different segments of different types of videos. Although not shown in FIG. 1A, user 102 may make the different requests 103 via a computing device interface, such as through a voice assistant interface and/or through a graphical user interface displayed on a screen. The different types of video in FIG. 1A are movies 120 (e.g., motion pictures available for streaming via one or more content delivery networks), catalog videos 122 (e.g., videos related to products available for sale via an e-commerce service), and game videos 124 (e.g., videos of video games being played).

In the examples depicted in FIG. 1A, user 102 has requested "Play Butch & Sam scenes from Crazytown movie." In this example, Butch and Sam may be characters in a movie called Crazytown that is available for streaming. In another example of a request 103 for video type: movies 120, the user 102 may request "Play video songs from Falala." In this example, the user 102 may want to play all segments of a movie entitled Falala that includes songs (e.g., the movie Falala may be a musical). In another example of a user 102 request 103 for the video type: movies 120, the user 102 may request "Play Falala for children under 18." In this example, the user 102 may want to see only those segments of the movie Falala that have been categorized as being appropriate for children. In another example, the user 102 has requested "Play fight scenes from Space Mission." In this example, the user 102 may want to see all segments categorized as "fight scenes" in a movie entitled Space Mission. In another example, the user 102 may request "Play Monica scenes from Buddies." In this example, the user 102 may want to see all scenes from a show entitled Buddies that include a character named Monica.

In an example of a request 103 for video type: catalog videos 122, the user 102 may request "Show me how to unbox Brand X TV." In this example, the user 102 may want to see a video related to the Brand X television that shows the user 102 how to unbox the television properly. In this case, the video may be associated with a listing of the Brand X television on an e-commerce service. In various examples, the categories for videos of the video type: catalog videos 122 may be different from the categories of videos of the video type: movies 120 or of the videos of the video type: game videos 124. For example, for videos of the video type catalog videos 122, "Unboxing" may be a particular category. In another example of a request 103 for video type:

catalog videos 122, the user 102 may request "Show me how to enable Bluetooth connection on Brand X TV." In this example, "connectivity" or "Bluetooth connectivity" may be a category.

In an example of a request 103 for video type: game videos 124, the user 102 may request, "Play the best staircase attacks in Duty Calls." In this example, the user 102 may want to see video segments related to the video game "Duty Calls" that have been categorized as "staircase attacks." In another example of a request 103 for a video type: game videos 124, the user 102 may request, "Play air attacks in counter battle." In this example, the user 102 may want to see video segments from the video game "Counter Battle" that are related to the category "air attacks."

The various requests 103 may be sent to a request analyzer service 104. The request analyzer service 104 may be a downstream component relative to a natural language processing program. Accordingly, the various spoken and/or typed user requests 103 may be parsed using a natural language processing system. The interpretation of the natural language processing system may be sent to the request analyzer service 104. In an example, input data representing the requests 103 that are sent to the request analyzer service 104 may identify a video type (e.g., movies 120, catalog videos 122, game videos 124, etc. In some other examples, the input data representing the requests 103 that are sent to the request analyzer service 104 may identify a name of the video (e.g., a name of the relevant movie, video game, catalog product, etc.). In various further examples, the input data representing the requests 103 that are sent to the request analyzer service 104 may identify one or more categories that the user wants to see.

For example, for the request 103 "Play video songs from Falala," the user wants to see segments of the movie Falala that are categorized as the belonging to the category "songs." In another example, for the request 103 "Play Butch & Sam scenes from Crazytown Movie," the user 102 wants to see segments of the movie Crazytown that include both the character Butch and the character Sam. In this example, the category may be "Character" and two attribute values for the Character category may be sent as the input data to the request analyzer service 104. For example, Category:Character Character="Butch" and Category:Character; Character="Sam". It should be appreciated that the exact form of the input data parsed by request analyzer service 104 depends on the specific implementation and that many different implementations are possible.

In various examples, the request analyzer service 104 may determine the categor(ies) of the particular video being requested and may send this output data (e.g., output data identifying the video, the category/categories, and the requested attribute value for each of the categories) to the user segmentation service 112. The user segmentation service 112 may communicate with database 107 to retrieve semantically relevant segments to the user request 103. In various examples, the videos may be parsed by auto-segmentation service 140 (FIG. 1B) prior to receiving the user request 103 to determine various segments related to a multitude of different categories. However, in some other implementations, the video indicated by the user's request 103 may be parsed by auto-segmentation service 140 in response to the user's request, to determine the semantically-relevant segments.

For example, a user may request all segments related to a particular minor character of a movie. The movie may not have been previously parsed to predict segments including the minor character (e.g., segments of Category:[character_name]). Accordingly, the auto-segmentation service 140 may predict those segments that include the minor character during runtime, in response to the received user request. The segments may be stored in the segment database 110. The user may provide feedback concerning the quality of the segments related to the minor character. Similarly, other users that subsequently request segments related to the minor character may provide feedback on the quality of the segments. Over time, the user feedback may be used to modify the category definition (e.g., by retraining the video segmentor 142) to improve the quality of the segments related to the minor character.

Video database 108 may store the videos available for playback by a video streaming service. Segment database 110 may store time code data indicating spans of the video related to a segment of a particular category. For example, for the request 103 "Play Butch scenes from Crazytown movie," the segment database 110 may store time code data for the movie Crazytown related to the category "Character" with the attribute value Character=Butch. The time code data may be the time spans of the movie Crazytown representing the segments of the video that include the character Butch. For example, the time code data may be [0:21:30-0:24:00]. This time code data may represent the segment of the movie Crazytown beginning at 21 minutes and 30 seconds and ending at 24 minutes and 00 seconds. This time span of the movie may represent the scene in which the character "Butch" appears.

As previously described, users may request multiple categories. In such cases, the request analyzer service 104 may merge the segments related to each category such that the conditions specified in the user request 103 are satisfied. For example, if the user 102 requests "Play Butch and Sam scenes in Crazytown," all segments classified as Character=Butch may be identified and all segments classified as Character=Sam may be identified. Then, the overlapping portion of these two sets of segments may be determined. For example, the time code data for segments including Butch may be [0:21:30-0:24:00] and the time code data for segments including Sam may be [0:22:30-0:25:37]. Accordingly, the overlapping segment of the video that includes both Butch and Sam may be represented by the time code data [0:22:30-0:24:00]. This time code data representing the requested segment may be sent to segment share service 106 that may send the relevant segment to the appropriate device(s). Sending the relevant segment to the appropriate device may include sending the time code data to one or more specified devices. Thereafter, a video player of the recipient device(s) may playback only the segments of the video identified by the time code data.

As previously described, the requested segments may be sent by segment share service 106 to various specified devices. For example, the user 102 may request that the segment(s) pertaining to the user 102's request 103 be sent to one or more of the user's friends and/or family members. Accordingly, segment share service 106 may send the relevant segments to the specified friends/family members. Accordingly, the user 102 may share the user's favorite segments with friends and family. In various examples, segments may be sent by segment share service 106 to friends and/or family by identifying an account associated with the target individuals (and/or by sending via SMS, email, and/or some other communication technique).

Videos in video database 108 may be sent to auto-segmentation service 140 for prediction of segments of the videos related to various different categories. Similarly, auto-segmentation service 140 may send the segments (e.g., in the form of time code data) predicted for a particular video back to database 107 for storage in segment database 110, as previously described.

Feedback engine 114 may allow users to provide user feedback on the quality of the segments generated by the auto-segmentation service 140. For example, a user may provide a segment rating 118 (e.g., a rating from 1 to 5 with 5 indicating that the segment quality was great and 1 indicating that the segment quality was poor) rating the quality of the segmentation of a video for a particular user request 103. Additionally, the user 102 may provide other forms of feedback data assessing the quality of a particular group of segments related to a user request 103. The various different forms of feedback data may be expressions of user satisfaction, frustration, a user stopping playback quickly after the segments begin playing, a user watching all segments in response to a request, etc. Such user feedback data may be stored as auto segment feedback 116. The feedback received by feedback engine 114 may be sent to auto-segmentation service 140 and may be used to retrain one or more machine learning models of the auto-segmentation service 140 (e.g., video segmentor 142). Additionally, the feedback received by feedback engine 114 may be used as a runtime input to the auto-segmentation service 140 and may be used to improve the predictive accuracy of the machine learned models used by auto-segmentation service 140. As previously described, the video segmentor 142 may implicitly learn video categories. The categories may be defined based on the learned features that are associated with the respective categories. For example, fight scenes may be associated with the presence of particular motion features, music features, action features, etc. The feedback engine 114 may provide user feedback on the quality of the segments generated for an implicitly learned category, and may be used to modify the category definition (e.g., by adjusting various learned features for the category) to improve user satisfaction.

Auto-segmentation service 140 may receive a video for semantic segmentation into a plurality of category-specific segments related to a plurality of different categories 144. Video segmentor 142 may be a multi-headed machine learning algorithm that may use various types of analyses to determine features of an input video. The video segmentor 142 may be trained using annotated video segment samples (in addition to other types of annotated data (e.g., audio samples, music samples, etc.)), as described below in reference to FIG. 4. The video segmentor 142 may learn features related to various different attributes of a video based on the annotated training data. For example, ML heads 160 of the video segmentor 142 may be trained to perform various different types of analyses on an input video in order to determine features of the input video. The features may be multi-dimensional vector representations of one or more attributes of the input video.

For example, music analysis head 160a may determine feature data representing various attributes of music present in the video. For example, the music analysis head 160a may determine feature data representing a tempo, pitch, musical style/genre, instrumentation, etc., of music for a given portion of the input video. Audio analysis head 160b may determine feature data representing various attributes of audio in the input video. For example, audio attributes may represent whether there is speech present, a decibel level, a relative loudness, whether there is music present, etc.

Motion analysis head 160c may determine feature data representing motion present in various portions of the input video. For example, a total amount of motion between two frames and/or an average amount of motion between frames of a particular portion of the input video may be determined and represented as feature data. Image analysis head 160d may perform object detection, object recognition, facial recognition, etc., to determine feature data representing objects present within portions of the video, actors/characters in various parts of the video, etc. Content/story analysis head 160e may determine feature data representing plot types, scene content (e.g., violence, action, drug-use, singing, adult content (e.g., content classified as non-suitable for children), a particular activity being engaged in, etc.), plot details, etc. Popularity/rating analysis head 160f may determine popular portions of an input video among different users and/or different classes of users (e.g., popular with teenaged girls, popular among viewers over 65, etc.). The various ML heads 160 depicted in FIG. 1B may not be an exhaustive list. Additionally, fewer and/or different ML heads 160 apart from those specifically shown and described may be used in accordance with the various techniques described herein, depending on the particular implementation.

In various examples, the ML heads 160 may be implemented using different types of machine learning algorithms that are appropriate to the particular classification/prediction task. For example, the music analysis head 160a may be implemented using a bi-directional long short term memory (LSTM) model and/or transformer model to take into account a sequence of musical notes and/or lyrics. By contrast, the image analysis head 160d may be implemented using an object detector convolutional neural network (CNN) that can recognize various image features (e.g., edges, different frequency image data) and classify various portions of the image that correspond to known objects/individuals. The image analysis head 160d may learn various features representing visual characteristics of the constituent images of the video. The foregoing examples are merely illustrative. Different machine learning algorithms may be used according to the particular implementation.

Categories 144 may describe different categories of content related to the input video. Several examples of categories 144 are depicted in FIG. 1B, including Songs (category 144a), fight scenes (category 144b), comedy (category 144c), graphics (category 144d), actors (category 144e), 18+(category 144f), place/setting (category 144g), etc. These categories are merely examples, many different categories may be used in accordance with the techniques described herein. Additionally, the categories may depend on the particular video type, as previously described. For example, the categories for video games may not be appropriate for the categories for movies.

During training, video segmentor 142 may learn that various attributes of a video are associated with one or more of the categories 144. For example, a training instance may be a portion of video that may be annotated with label data indicating that the portion of video includes a particular actor, includes a certain amount of motion, includes violence, includes comedy, includes a particular music type, is popular among males aged 15-25, etc. Additionally, the training instance may be tagged with one or more categories (e.g., fight scene, comedy, 18+). Using a large amount of such training instances, video segmentor 142 may learn that portions of video that include similar attributes may be categorized in similar ways. Accordingly, the video segmentor 142 may learn, for example, that videos that include the attributes of high motion, punching actions, kicking actions, fast-paced music, etc., may be typically categorized with the "fight scene" category 144b.

In addition to analysis of the various attributes of different portions of an input video, video segmentor 142 may also receive external inputs 146 indicating factors that are external to the input video itself. For example, the geographic region and/or country of a particular user 102 making a request 103, the region of the video, spoken language, etc., may be external inputs 146 and may be used to determine and categorize segments of the input video along with the analyses performed by the various machine learning heads 160.

Accordingly, for a given input video, the video segmentor 142 may determine a plurality of different, often overlapping segments, each tagged with one or more categories. As previously described, the segments may comprise time codes representing time spans of the video that are related to the tagged category. The segments (e.g., the time code data) may be sent to database 107 and stored in segment database 110 in association with data identifying the particular video (e.g., a video label for the segment) and data identifying each category to which the segment pertains (e.g., a category label for the segment). Accordingly, once the segment is cataloged and stored in segment database 110, user segmentation service 112 can retrieve the segments in response to a user request received at request analyzer service 104.

Figure 2:
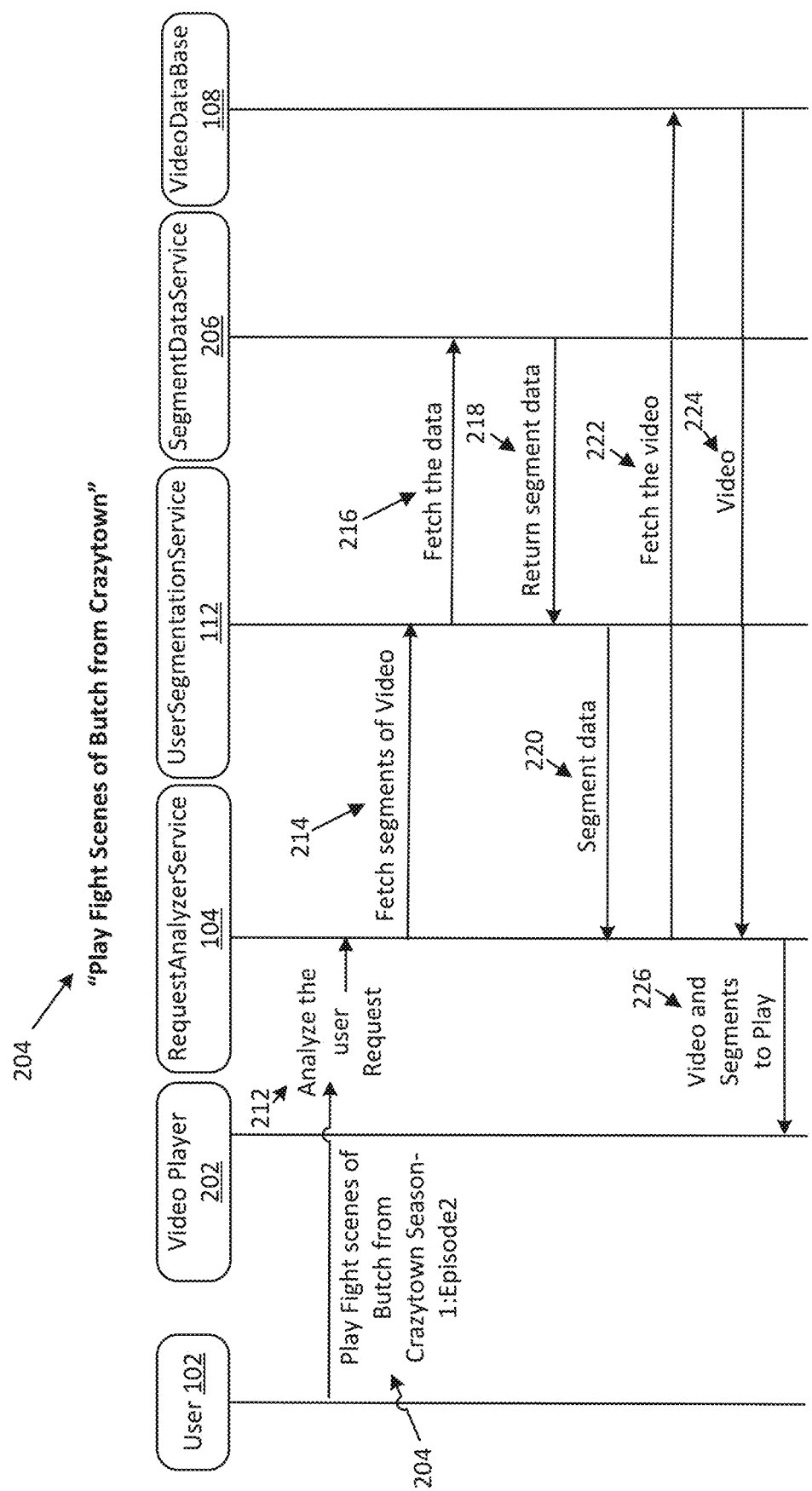
FIG. 2 depicts a sequence diagram depicting an example process for retrieving semantically relevant video segments based on a user request, in accordance with various aspects of the present disclosure.

FIG. 2 depicts a sequence diagram depicting an example process for retrieving semantically relevant video segments based on a user request, in accordance with various aspects of the present disclosure. The sequence depicted in FIG. 2 begins with user 102 inputting a request 204, "Play fight scenes of Butch from Crazytown Season 1: Episode 2." In various examples, user 102 may make this spoken request to a video player 202 (e.g., a computing device local to the user 102 that includes a video player). The request 204 is related to a show entitled Crazytown and specifies a particular season and episode of the show. Additionally, the request 204 indicates two different requested categories—the Character category and the Fight Scenes category. For the character category, the request 204 specifies the character "Butch." The fight scene category has no specific type of fight scene specified by the request.

The video player 202 sends the request to request analyzer service 104. Request analyzer service 104 performs operation 212, and analyzes the user request. The user request 204 may be parsed either by request analyzer service 104, upstream NLU processing, or some combination thereof to determine data identifying the video for which segments are to be determined, one or more categories of the segments, and, in some examples, attribute values specified for the categories. For example, for the category songs, an attribute value could be "ballads," "heavy metal". For the category "Character" the attribute value could be the name of the character. The request analyzer service 104 may pass the specified categories and/or attribute values to the user segmentation service 112. In response, the user segmentation service 112 may fetch the segments of the specified video (operation 214). The user segmentation service 112 may send a request for the segments of the specified category from the specified video to segment data service 206 (operation 216).

The segment data service 206 may have access to segment database 110 (FIG. 1A) and may retrieve the segments of the specified category/attribute value for the particular video. As previously described, the segments may comprise time code data indicating time spans of the video that are categorized with the requested category and/or attribute value. The segment data service 206 may return the segment data comprising the time code data to the user segmentation service 112 at operation 218. The user segmentation service 112 may, in turn, return the segment data to the request analyzer service 104 (operation 220). The request analyzer service 104 may request the video identified in the request 204 from the video database 108 (operation 222). The video database 108 may return the video 224 to the request analyzer service 104. The request analyzer service may send the video 224 and the segment data to the video player 202 (operation 226). The video player 202 may initiate playback of the segments (and may not play back other portions of the video).

In some examples, only the segments of the video identified by the time code data may be streamed to the video player for playback. Accordingly, the video player 202 may play only those segments without playing intervening portions of the video. In other examples, the time code data may be sent to the video player 202 along with the requested video. The video player 202 may play only the portions of the video identified using the time code data. In some other examples, the video player 202 may communicate with the backend streaming server to request only the segments identified by the time code data for streaming to, and playback by, the video player 202.

Figure 3:
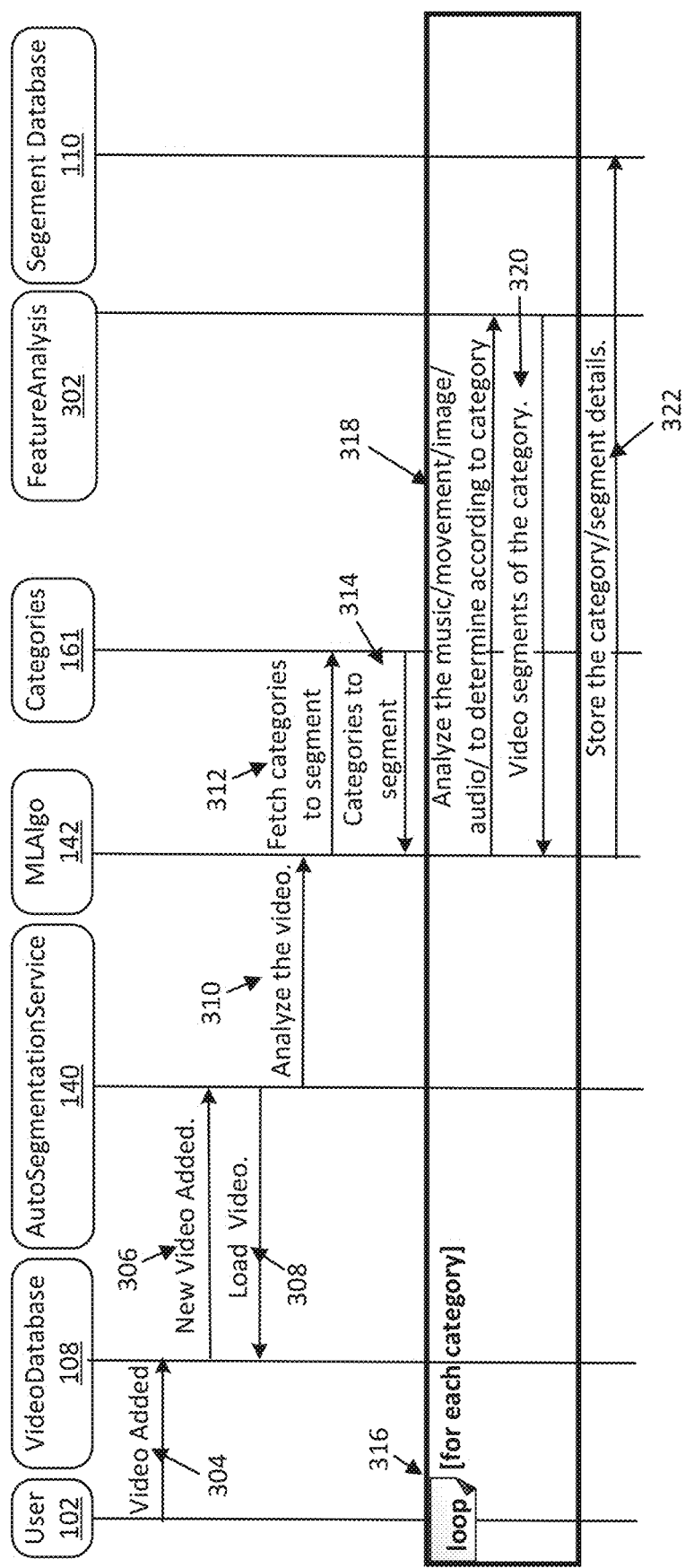
FIG. 3 depicts another sequence diagram depicting an example semantic segmentation process for segmenting videos according to different categories, in accordance with various aspects of the present disclosure.

FIG. 3 depicts another sequence diagram depicting an example semantic segmentation process for auto-segmentation of a video 301 according to different categories, in accordance with various aspects of the present disclosure. In various examples, a user 102 may upload a video to the video database 108 (e.g., operation 304). Auto-segmentation service 140 may determine that a new video has been added to video database 108 (operation 306). Auto-segmentation service 140 may load the video into memory (operation 308) and may analyze the video 310. Analyzing the video may include determining a type of the video (e.g., movie, catalog video, game video, etc.), the region of the video, other external data related to the video, etc.

At operation 312, the machine learning algorithm (e.g., video segmentor 142) may retrieve the categories on which to segment the video from a category database 161. The retrieved categories may be specific to the video type and/or to some combination of the video type, the region, and/or other external data related to the video. The categories on which to segment the video may be retrieved from the category database 161 at operation 314.

Thereafter, loop 316 may be executed by the machine learned video segmentor 142, using feature analysis 302. Feature analysis may be performed by machine learning heads 160 (FIG. 1). Loop 316 may be executed for each category retrieved from category database 161 for the current video. At operation 318, the machine learning heads 160 of the video segmentor 142 may analyze various aspects of the video to determine feature data numerically representing various attributes of different portions of the video. The analysis may be performed on single frames, multiple frames, single time stamps, spans of time stamps, and/or some combination thereof. For example, an object detection algorithm pertaining to image analysis head 160d may execute on individual frames of the video, while music analysis head 160a may operate on a span of time stamps pertaining to a portion of the audio track of the video. Feature analysis 302 may comprise determining feature data numerically representing the various attributes of different portions of the video by the machine learning heads 160.

At operation 320, video segments for the various different categories retrieved from category database 161 for the video may be generated based on the feature data generated by feature analysis 302. The machine learned video segmentor 142 may determine, based on the feature data generated for various portions of the video (e.g., time stamps and/or ranges of time stamps of the video) the categories that describe those portions of the video. Accordingly, the video segments may comprise the time code data along with data identifying the categories and/or attribute values of the categories for the video. At operation 322, the category/segment details (e.g., the time code data, category identification data, etc.) may be stored in segment database 110.

Figure 4:
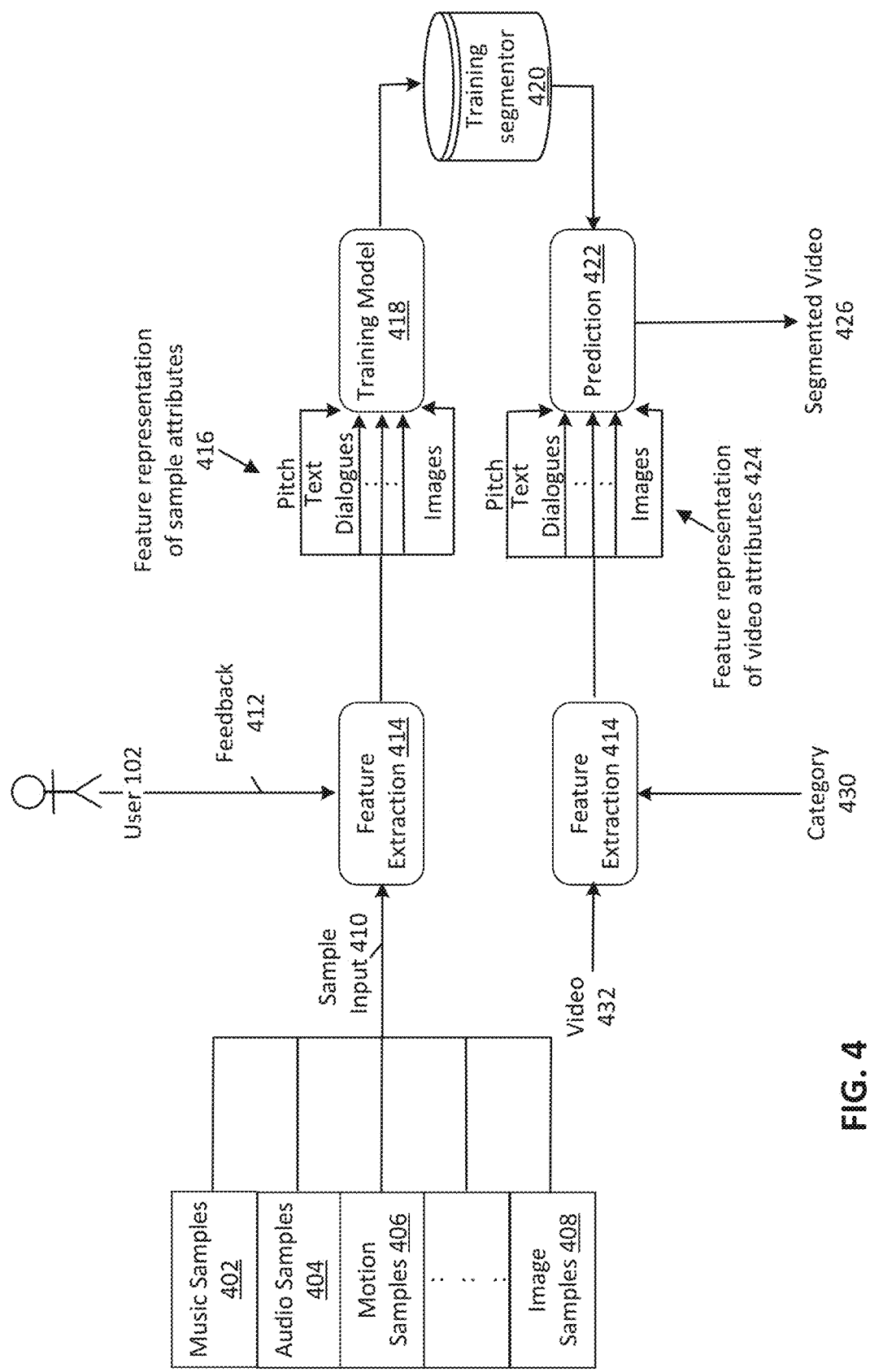
FIG. 4 depicts a block diagram illustrating an example of a machine learning architecture that may be used to semantically segment videos based on different categories, in accordance with various aspects of the present disclosure.

FIG. 4 depicts a block diagram illustrating an example of a machine learning architecture that may be used to semantically segment videos based on different categories, in accordance with various aspects of the present disclosure. In order to train the machine learned video segmentor 142 (and/or the various machine learning heads 160), various training data may be sent to the machine learning models during training. The training data may comprise music samples 402, audio samples 404, motion samples 406, image samples 408, etc. The samples may be labeled with various ground truth data representing one or more attributes of the sample. For example, a music sample 402 may be labeled with a musical style, a tempo, a musical artist performing a song in the sample, etc. Motion samples 406 may be labeled with data indicating an average amount of motion between consecutive frames, data indicating an action occurring in the sample, data indicating a type of movement in the sample, etc. Image samples 408 may be labeled with data representing an identity of objects appearing in the sample, an actor appearing in the sample, a character name of a character in the sample, etc.

The various samples may be input at operation 410 for feature extraction 414. Additionally, user feedback 412 related to the samples may be provided. The machine learning algorithm may learn to generate feature representations of the various attributes 416 specified in the samples. The feature representations may be sent to the training model 418 that may learn to classify one or more categories of a portion of a video based on the features determined for that portion of the video. The trained model may be iteratively updated and parameters and/or hyperparameters for the trained model may be stored as training segmentor 420.

During auto-segmentation of a video, the video 432 may be sent to feature extraction 414. Additionally, the category 430 requested for the video 432 may be sent to feature extraction 414. The feature representation of the various video attributes 424 of the various portions of the video 432 may be determined. Prediction 422 may determine, based on the feature data representing the video attributes 424 which portions of the video pertain to the category 430 based on relationships between categories and video attributes learned by the training segmentor 420. Accordingly, prediction 422 may generate segments of the video that are predicted to pertain to the category 430.

The segments may be stored as segmented video 426 for the particular category 430 in segment database 110. The segments (e.g., the time code data) may thereafter be retrieved in response to user queries for segments of the video related to the category 430. Note that different users can request the segments for viewing.

Figure 5:
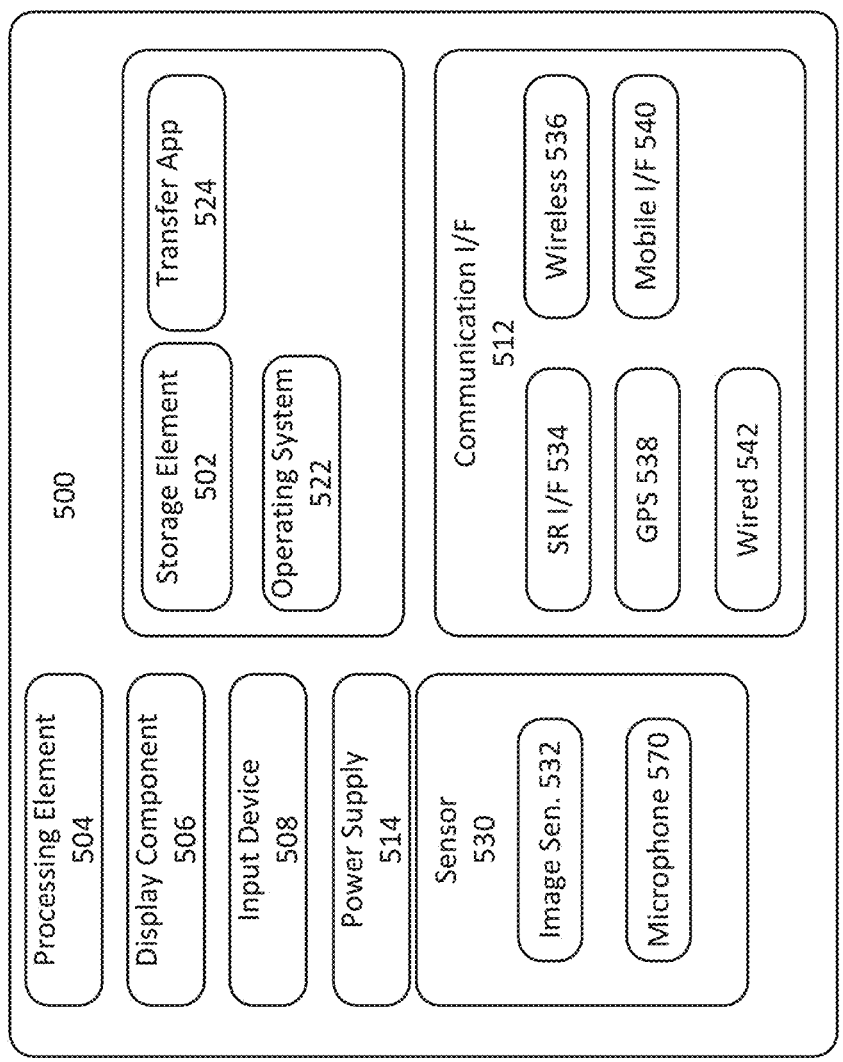
FIG. 5 is a block diagram showing an example architecture of a computing device that may be used in accordance with various aspects of the present disclosure.

FIG. 5 is a block diagram showing an example architecture 500 of a computing device that may be used to instantiate the various machine learning models and/or perform semantic segmentation of videos, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display suggested personalized search queries generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 604, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
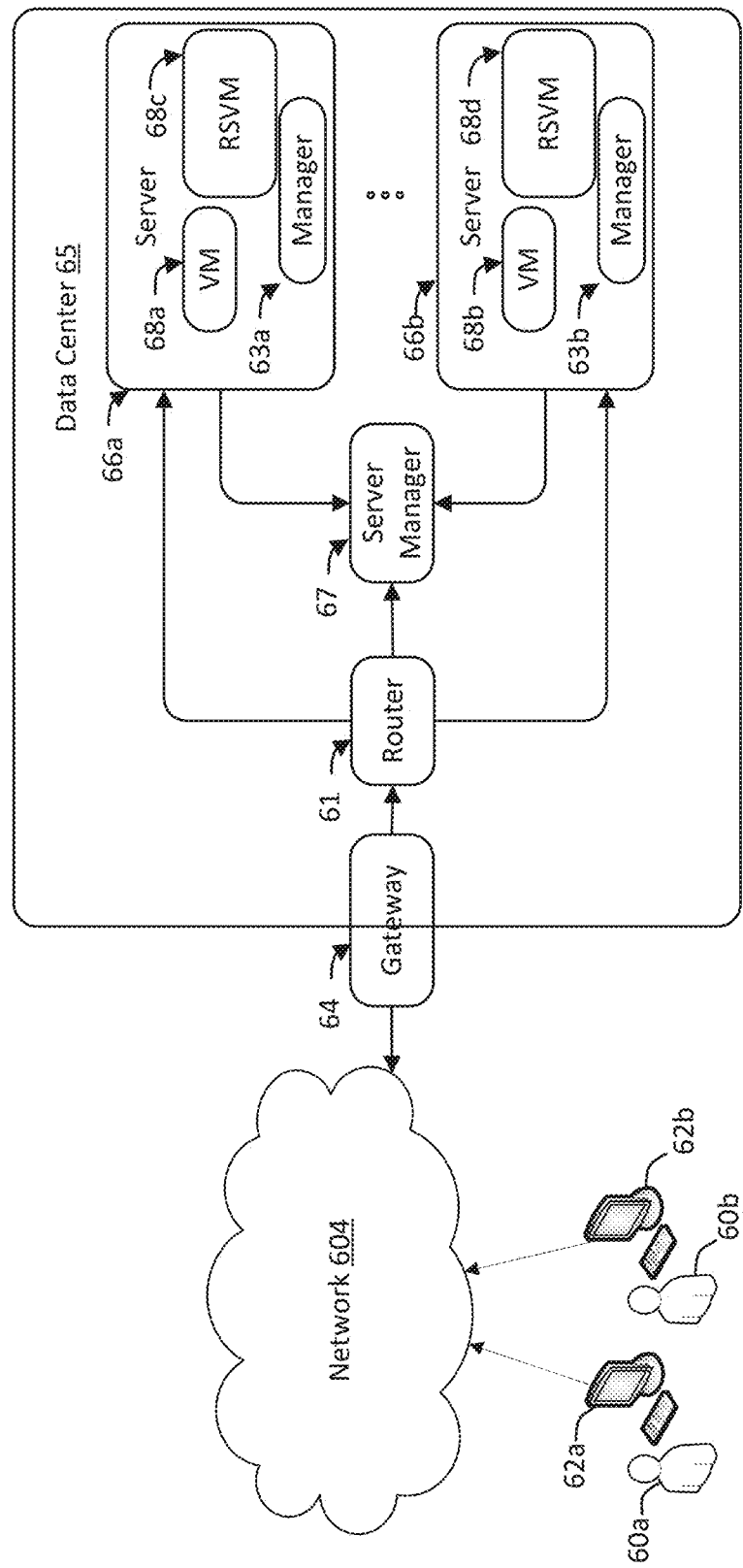
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 5 may be used to provide the various machine learning models described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 604. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 604 may, for example, be a publicly accessible network of linked networks and possibly operated by various distinct parties, such as the Internet. In other embodiments, network 604 may be a private network, such as a corporate or university network that is wholly or partially inaccessible to non-privileged users. In still other embodiments, network 604 may include one or more private networks with access to and/or from the Internet.

Network 604 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 604. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++, and the like, or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
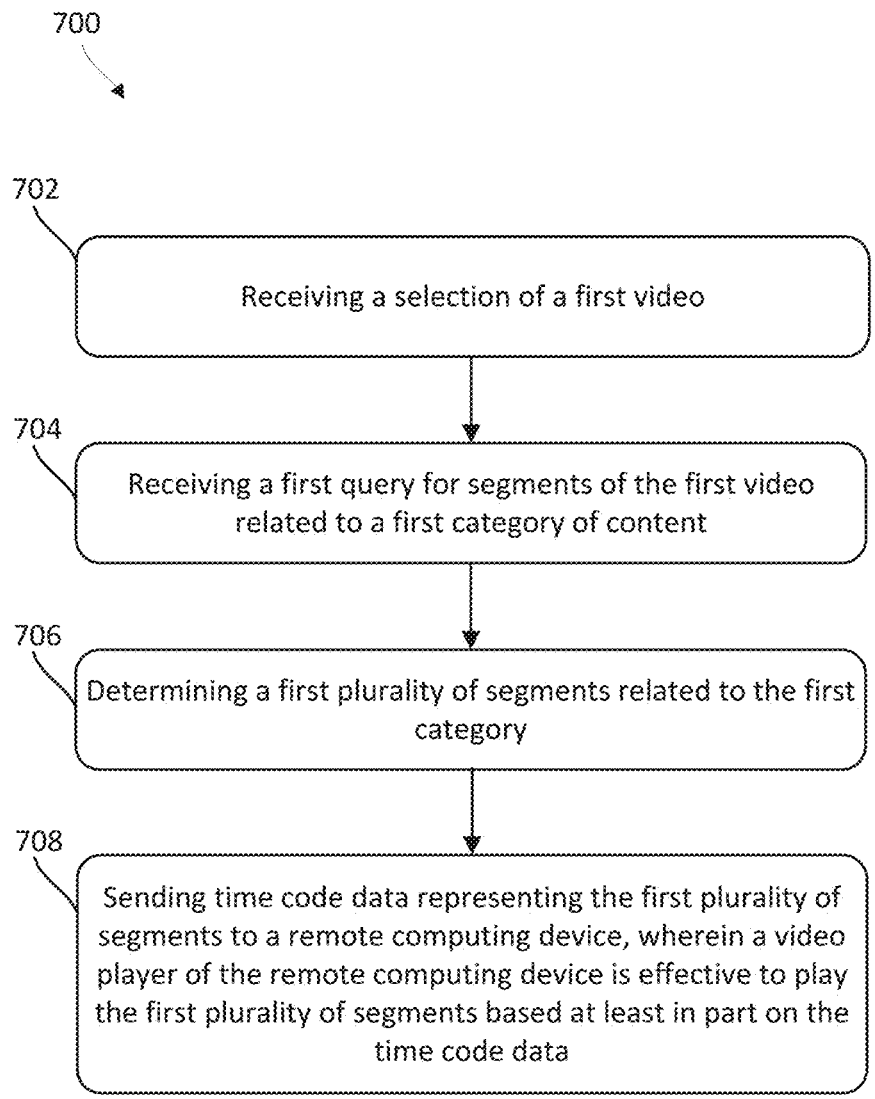
FIG. 7 is a flow chart illustrating an example process for retrieving segments of a video related to a user-requested category, in accordance with various aspects of the present disclosure.

FIG. 7 is a flow chart illustrating an example process 700 for retrieving segments of a video related to a user-requested category, in accordance with various aspects of the present disclosure. Those actions in FIG. 7 that have been previously described in reference to FIGS. 1-6 may not be described again herein for purposes of clarity and brevity. The actions of the process depicted in the flow diagram of FIG. 7 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 may begin at action 702, at which a selection of a first video may be received. In various examples, a user may select a video for playback and/or segmenting from a library of videos. For example, a user may select a video from an online streaming service via a GUI input or a voice input. The user's selection of the first video may be received by request analyzer service 104 as metadata that identifies the first video from among other videos.

Processing may continue at action 704, at which a first query for segments of the first video that are related to a first category of content may be received. For example, the user may request all car chase scenes in the first movie using a voice interface and/or a GUI. Data representing the category (e.g., "car chase scenes") identified in the first query from the user may be sent as data to request analyzer service 104. In some cases, the first query may include an identification of a category and an attribute value for that category. For example, if the user requests "Show all scenes with the Queen," the category may be determined to be "Character" and the attribute value for the category may be "Queen."

Processing may continue at action 706, at which a first plurality of segments related to the first category may be determined. Request analyzer service 104 may communicate with user segmentation service 112 to request segments for the first video that are tagged with metadata indicating the requested category. The segments tagged with the requested category may be retrieved from segment database 110. As previously described, the segments may be stored as time code data. For example, for the user request "Show all scenes with the Queen" the segment database 110 may be searched for all scenes from the first video tagged with the category:attribute value "Character:Queen." A list of segments may be retrieved, such as [05:14-9:37], [14:01-14:59], [25:25-33:04], etc. The time code data may identify the spans of time in the first video in which the Queen appears in the scene. The segments may have been previously generated using the auto-segmentation service 140 and/or the machine learning algorithms thereof. In some other examples, the first video may be segmented in response to the user's request on the basis of the requested category.

Processing may continue at action 708, at which time code data representing the first plurality of segments may be sent to a remote computing device. The video player of the remote computing device may be effective to play the first plurality of segments based at least in part on the time code data. At action 708, the time code data representing the requested segments may be sent to a client device for playback. The video player (e.g., video player 202) may be effective to playback the segments identified by the time code data without playing back the entire video. Accordingly, only the segments pertaining to the requested category may be played back.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of segmenting video content, comprising:
   receiving, by a first computing device from a remote computing device, a selection of a first video available for streaming;
   receiving, by the first computing device, a first query for segments of the first video related to a first category of video content;
   determining, by the first computing device, a first plurality of temporal segments of the first video related to the first category of video content, wherein each temporal segment of the first plurality of temporal segments comprises a respective time span of video content, wherein the first plurality of temporal segments of the first video are predicted by a machine learned model based at least in part on image analysis used to determine first feature data representing image features of the first video, audio analysis used to determine second feature data representing audio features of the first video;
   determining first time code data identifying a first temporal segment of the first plurality of temporal segments of the first video, wherein the first time code data is determined by the machine learned model;

determining second time code data representing a second temporal segment of the first plurality of temporal segments, wherein the first temporal segment and the second temporal segment are separated by a first plurality of intervening frames of the first video; and sending the first video, the first time code data, and the second time code data to the remote computing device, wherein a video player of the remote computing device is configured to consecutively play the first temporal segment and the second temporal segment without playing the first plurality of intervening frames of the first video using the first time code data and the second time code data.

2. The method of claim 1, further comprising:
receiving, by the first computing device from the remote computing device, a second query for segments of the first video related to a second category of video content different from the first category;
determining, by the first computing device, a second plurality of temporal segments of the first video related to the second category of video content, wherein the second plurality of temporal segments are predicted by the machine learned model based at least in part on image analysis or audio analysis, and wherein at least some of the second plurality of temporal segments of the first video overlap the first plurality of temporal segments; and
sending third time code data identifying the second plurality of temporal segments of the first video to the remote computing device, wherein the video player of the remote computing device is configured to consecutively play the second plurality of temporal segments of the first video without playing intervening portions of the first video using the third time code data.

3. The method of claim 1, further comprising:
receiving user feedback data indicating user satisfaction with respect to the first plurality of temporal segments; and
updating at least one parameter of the machine learned model based on the user feedback data.

4. A method of segmenting video, comprising:
receiving a selection of a first video;
receiving a first query for a first category of content in the first video;
determining a first plurality of temporal segments of the first video related to the first category, wherein each temporal segment of the first plurality of temporal segments comprises a respective time span of video content related to the first category;
determining first time code data representing a first temporal segment of the first plurality of temporal segments;
determining second time code data representing a second temporal segment of the first plurality of temporal segments, wherein the first temporal segment and the second temporal segment are separated by a first plurality of intervening frames of the first video; and
sending the first time code data representing the first temporal segment and second time code data representing a second temporal segment to a remote computing device, wherein a video player of the remote computing device is effective to play the first temporal segment and the second temporal segment of the first video without playing the intervening frames of the first video, based at least in part on the first time code data and the second time code data.

5. The method of claim 4, further comprising:
predicting, using a machine learned model, the first plurality of temporal segments related to the first category; and
generating, by the machine learned model, the first time code data comprising metadata associating the time span of the first temporal segment of the first video with the first category.

6. The method of claim 4, further comprising predicting, using a machine learned model, the first plurality of temporal segments related to the first category based at least in part on image analysis performed using at least one object detector.

7. The method of claim 4, further comprising predicting, using a machine learned model, the first plurality of temporal segments related to the first category based at least in part on audio analysis.

8. The method of claim 4, further comprising predicting, using a machine learned model, the first plurality of temporal segments related to the first category based at least in part on a first annotated video segment and a second annotated video segment, wherein:
the first annotated video segment comprises first label data associating first visual characteristics with the first category; and
the second annotated video segment comprises second label data associating second visual characteristics with a second category.

9. The method of claim 4, further comprising:
receiving, from the remote computing device, first feedback data indicating a level of satisfaction with the first plurality of temporal segments; and
storing the first feedback data in association with the first plurality of temporal segments or the time code data in a non-transitory computer-readable memory.

10. The method of claim 4, further comprising:
determining, for the first video, a plurality of categories for the first video; and
determining, for each category of the plurality of categories, a respective plurality of category-specific temporal segments based on analysis of audio and music of the first video.

11. The method of claim 10, further comprising determining, for each category of the plurality of categories, the respective plurality of category-specific temporal segments based on analysis of motion in the first video.

12. The method of claim 4, wherein the first category relates to content suitable for children, and wherein the first plurality of temporal segments are selected to exclude content of the first video classified as non-suitable for children.

13. The method of claim 4, predicting, using a machine learned model, the first plurality of temporal segments related to the first category, wherein the machine learned model is trained using a set of training data comprising video segments, wherein each of the video segments comprises a respective category label.

14. A system comprising:
at least one processor; and
non-transitory computer-readable memory storing instructions that, when executed by the at least one processor, are effective to:
receive a selection of a first video;
receive a first query for a first category of content in the first video;
determine a first plurality of temporal segments of the first video related to the first category, wherein each segment of the first plurality of temporal segments comprises a respective time span of video content related to the first category;

determine first time code data representing a first temporal segment of the first plurality of temporal segments;

determine second time code data representing a second temporal segment of the first plurality of temporal segments, wherein the first temporal segment and the second temporal segment are separated by a first plurality of intervening frames of the first video; and send the first plurality of temporal segments to a remote computing device, wherein a video player of the remote computing device is effective to play the first plurality of temporal segments of the first video without playing intervening portions of the first video.

15. The system of claim 14, the non-transitory computer-readable memory storing further instructions that, when executed by the at least one processor, are further effective to:

predict, using a machine learned model, the first plurality of temporal segments related to the first category; and generate, by the machine learned model, the first time code data comprising metadata associating the time span of the first temporal segment of the first video with the first category.

16. The system of claim 14, the non-transitory computer-readable memory storing further instructions that, when executed by the at least one processor, are further effective to predict, using a machine learned model, the first plurality of temporal segments related to the first category based at least in part on image analysis performed using at least one object detector.

17. The system of claim 14, the non-transitory computer-readable memory storing further instructions that, when executed by the at least one processor, are further effective to predict, using a machine learned model, the first plurality of temporal segments related to the first category based at least in part on audio analysis.

18. The system of claim 14, the non-transitory computer-readable memory storing further instructions that, when executed by the at least one processor, are further effective to:

predict, using a machine learned model, the first plurality of temporal segments related to the first category based at least in part on a first annotated video segment and a second annotated video segment, wherein:

the first annotated video segment comprises first label data associating first visual characteristics with the first category; and the second annotated video segment comprises second label data associating second visual characteristics with a second category.

19. The system of claim 14, the non-transitory computer-readable memory storing further instructions that, when executed by the at least one processor, are further effective to:

receive, from the remote computing device, first feedback data indicating a level of satisfaction with the first plurality of temporal segments; and store the first feedback data in association with the first plurality of temporal segments in a non-transitory computer-readable memory.

20. The system of claim 14, the non-transitory computer-readable memory storing further instructions that, when executed by the at least one processor, are further effective to:

determine, for the first video, a plurality of categories for the first video; and determine, for each category of the plurality of categories, a respective plurality of category-specific temporal segments based on analysis of audio and music of the first video.

* * * * *